United States Patent [19]

Sumikawa

[11] Patent Number: 6,040,817
[45] Date of Patent: Mar. 21, 2000

[54] DISPLAY APPARATUS AND METHOD FOR DISPLAYING WINDOWS ON A DISPLAY

[75] Inventor: Akihiro Sumikawa, Saitama, Japan

[73] Assignee: Fuji Xerox Co., Ltd., Tokyo, Japan

[21] Appl. No.: 08/193,356

[22] Filed: Feb. 3, 1994

Related U.S. Application Data

[63] Continuation of application No. 07/896,887, Jun. 10, 1992, abandoned, which is a continuation of application No. 07/595,802, Oct. 10, 1990, abandoned.

[51] Int. Cl.$^7$ ........................................................ G09G 5/00
[52] U.S. Cl. ............................................ 345/113; 345/345
[58] Field of Search ................................... 340/721, 722, 340/723, 724, 709, 710; 364/521; 395/156, 157, 159; 345/118, 119, 120, 156, 157, 340, 342, 343, 344, 345, 121, 113

[56] References Cited

U.S. PATENT DOCUMENTS 4,642,790  2/1987  Minshull et al. ........................ 340/724
4,789,962  12/1988  Berry et al. .............................. 340/721

OTHER PUBLICATIONS

Microsoft Windows, Version 2.03, pp. 42–43 and 72–73, 1987.
Working With Word, Kanita, 1988, pp. 360–363.

*Primary Examiner*—Chanh Nguyen
*Attorney, Agent, or Firm*—Finnegan, Henderson, Farabow, Garrett & Dunner, L.L.P.

[57] ABSTRACT

A display apparatus employing an information processor including a display for displaying information as an image on a surface, a display controller for causing the display to display a window containing first information, a cursor control for indicating a point on the display, and controller for positioning the window at a distance from the point to allow second information to be displayed therebetween.

11 Claims, 5 Drawing Sheets

DISPLAY APPARATUS AND METHOD FOR DISPLAYING WINDOWS ON A DISPLAY

This application is a continuation of application Ser. No. 07/896,887 filed Jun. 10, 1992, now abandoned, which is a continuation of application Ser. No. 07/595,802, filed Oct. 10, 1990, now abandoned.

BACKGROUND OF THE INVENTION

1. Field of the Invention

The present invention relates to a display apparatus employing an information processor for processing information by displaying a window or a cursor on a display, and more particularly to processing information with improvements made on the operating efficiency of a cursor with respect to a window.

2. Discussion of the Related Art

In relatively high-level information processors, windows of a multi-window type are displayed on their displays so as to permit effective processing of various data.

FIG. 11 illustrates an example of the contents of a display in such an information processor. Two windows 12-1, 12-2 and a cursor 13 are displayed on a display 11. It is assumed that, for instance, a table is displayed in the first window 12-1. It is assumed that various keys used for calculating the table are displayed in the window 12-2. In this case, the operator enters data in the table while moving the cursor 13 between the two windows 12-1, 12-2.

When such processing is being effected, the windows 12-1, 12-2 do not move from their display positions even if the cursor 13 is moved. Thus, with the conventional information processors, even if the cursor itself is moved, the windows do not move from the current display positions on the display. For this reason, in cases where two windows are displayed at relatively spaced apart positions, as shown in FIG. 11, it has been necessary to move the cursor between the two windows frequently over a relatively long distance. Hence, it is necessary to move the mouse on a desk repeatedly to effect one movement so that the operating efficiency is poor.

Devices are known which are equipped with the functional ability to move the windows 12-1, 12-2. In a certain information processor, if a left button of the mouse is pressed in a state in which the cursor 13 is moved to a point (not shown) called a control point provided at a corner of the window, and the mouse is moved on the desk, then the window 12 can be moved correspondingly. With this apparatus, the button of the mouse is released when the window has reached a desired position.

With such apparatus, however, the operation of moving the window to a desired position can only be done after the cursor is positioned at a particular point so that the operation of the display is somewhat troublesome and inefficient.

SUMMARY OF THE INVENTION

The present invention has been made in view of the above circumstances and has as an object to provide a display apparatus employing an information processor which allows a window, i.e., a subject to be moved, to be moved without positioning a cursor directly on the window to overcome the above-described drawbacks of the conventional art.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the display apparatus employing an information processor of this invention comprises means for displaying information on the display, means associated with the information processor for displaying a window on the display to contain first information, cursor means for indicating a point on the display, and means associated with the information processor, for positioning the window at a distance from the point to allow second information to be displayed therebetween.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

In the drawings,

FIG. 2 is a plan view illustrating a part of the contents of a window initially displayed on a display when a spreadsheet is being prepared;

FIG. 3 is a plan view illustrating a part of the contents of a window when the operation of determining a type of input data is performed;

FIG. 4 is a plan view illustrating essential portions of a display screen in a state in which the operator has designated a B1 cell;

DETAILED DESCRIPTION OF THE PREFERRED EMBODIMENT

Referring now to the accompanying drawings, a detailed description will be given of a preferred embodiment of the present invention.

Figure 1:
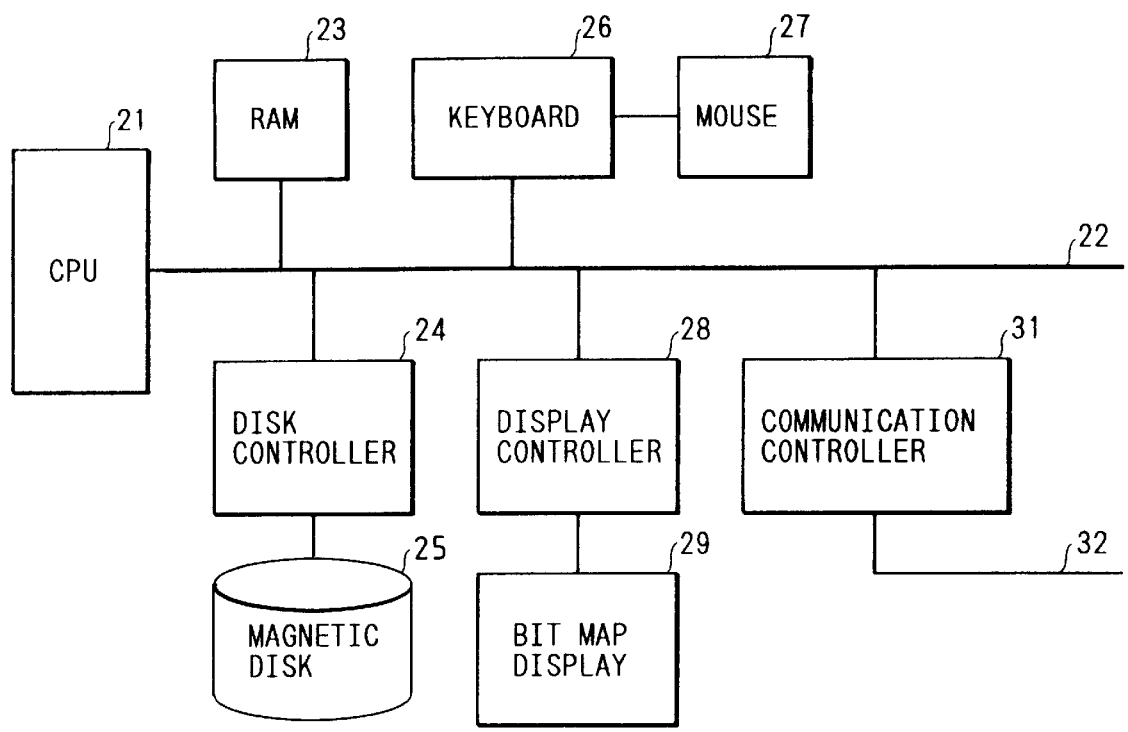
FIG. 1 is a block diagram illustrating essential portions of a circuit configuration of an information processor according to the present invention.

FIG. 1 shows a block diagram of a circuit configuration of an information processor in accordance with the present invention. This information processor has a central processor (CPU) 21 connected to various circuit components via a bus 22 such as a data bus. A RAM 23 (random access memory) stores operations and is arranged to temporarily store a program for controlling the processor and various data. A disk controller 24 controls the input and output of data with respect to a magnetic disk 25. The program for controlling the processor and data such as documents already prepared are stored on the magnetic disk 25.

A keyboard 26 is provided for inputting data by operating keys, and a mouse 27 serving as a pointing device is connected thereto. A display controller 28 controls the display of image information on a bit map display 29. A communication controller 31 is arranged to transmit data to another information processor, a printer, and the like via a communication cable 32, and to receive necessary data from the other devices.

Figures 2, 3, 4:
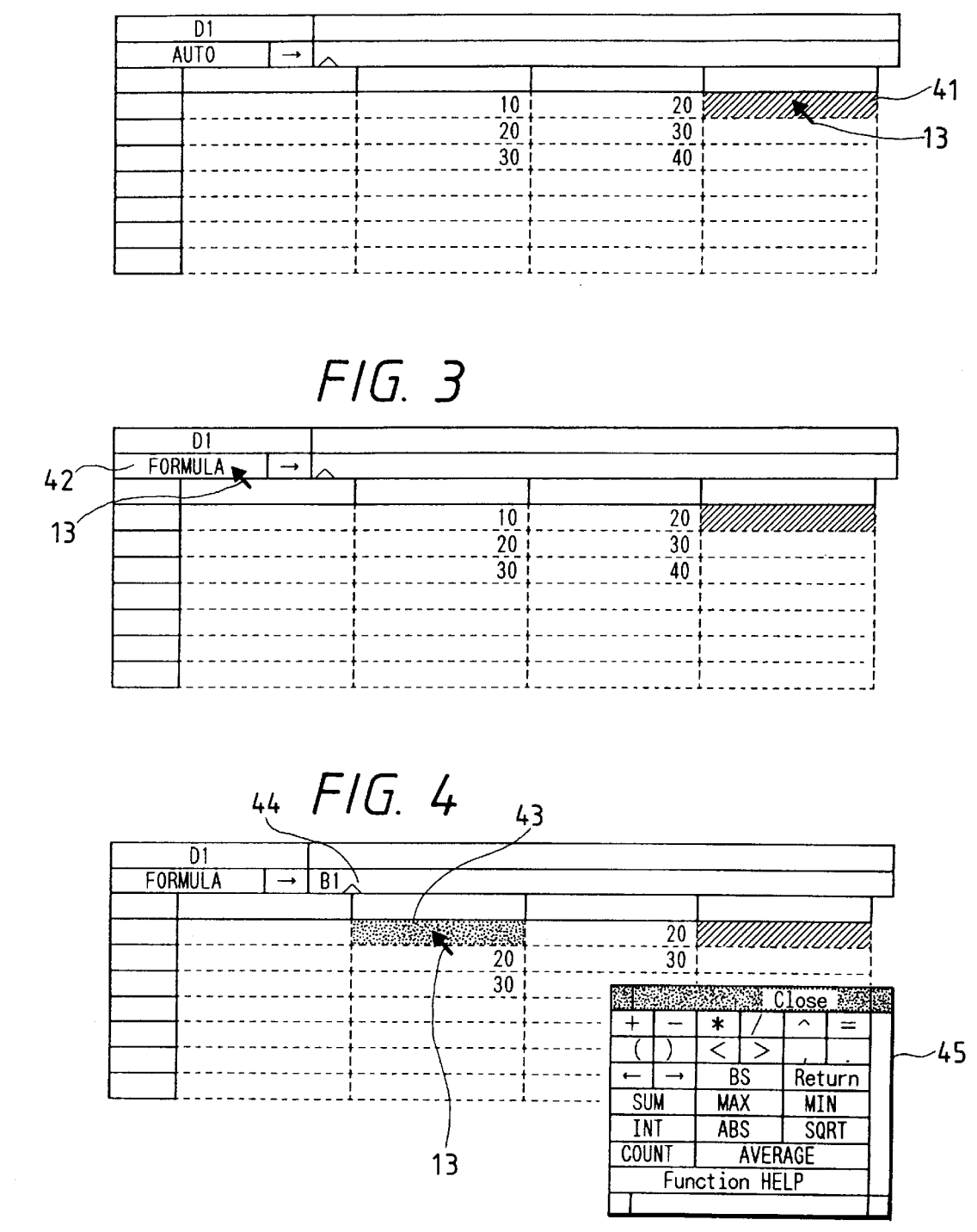

FIG. 2 illustrates a part of the contents of a window initially displayed on a display when a spreadsheet is prepared by using the processor.

In this window, a table into which some of the contents have already been entered is displayed. Now, it is assumed that the operator inputs a formula "B1+C1" into a D1 cell 41. Here, alphabetic characters A, B, C, ... are allotted to the respective cells horizontally in that order from the leftmost end, and numerals 1, 2, 3, ... are allotted vertically in that order from the uppermost (top) end. Thus, an arrangement is provided such that the positions of the respective cells can be specified by combinations of these characters and numerals.

In this case, the operator positions a cursor 13 on the D1 cell 41 by moving a mouse 27 (see FIG. 1) on the desk, and clicks the left one of the two buttons attached to the mouse 27. Then, the D1 cell 41 is highlighted, as shown in FIG. 2.

FIG. 3 illustrates a part of the contents of the window at a time when the operation of determining the type of input data is effected. The operator positions the cursor 13 on a designated are a 42 of the input data type provided in an upper portion of the window for a spreadsheet, and presses the left button of the mouse 27. In consequence, the fact that the type of the input data is a "formula" is set in the processor. In this state, the operator inputs the formula.

FIG. 4 illustrates essential portions of a display screen in a state in which the operator has designated a B1 cell. When the operator positions the cursor 13 on the B1 cell 43 by operating the mouse 27 and clicks the left button, a character string B1 is displayed in an input editing area 44 in an upper portion of the window. In addition, in this state, an auxiliary input window 45 appears to the lower left of the cursor 13, which controls the display position of the auxiliary input window.

Figure 5:
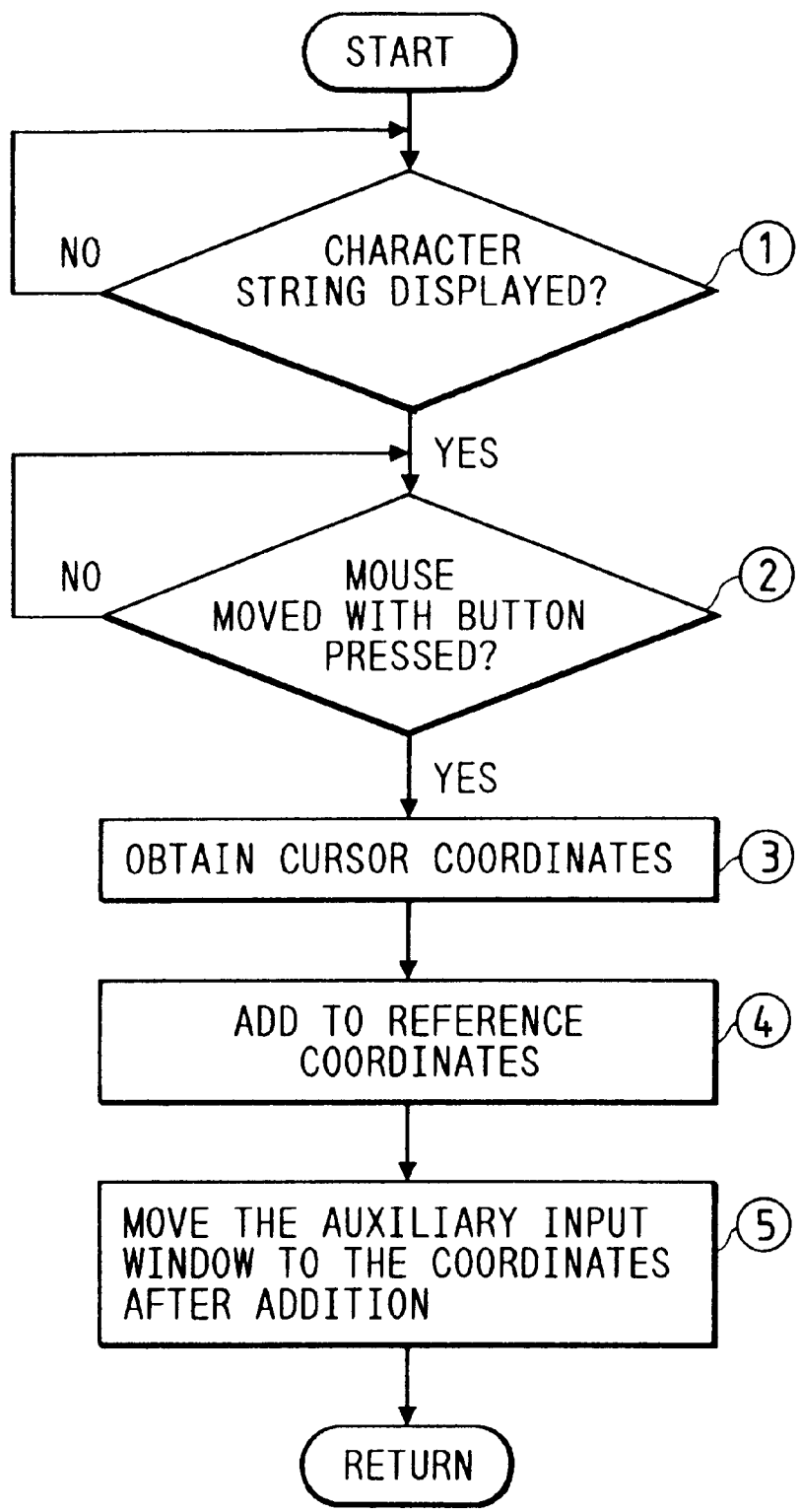
FIG. 5 is a flowchart illustrating the manner of controlling the display of an auxiliary input window according to the present invention.

FIG. 5 illustrates the manner in which the display apparatus controls the display position of the auxiliary input window. When the character string is displayed in the input editing area 44 in the upper portion of the window as the result of inputting the character string, as described above, (Step 1 in FIG. 5), the CPU 21 (see FIG. 1) monitors whether or not the mouse 27 has moved with the left button pressed (Step 2). Then, when this condition is met (Y), the latest coordinate values of the cursor on the bit map display 29 are obtained. These coordinate values are assumed to be $(x_c, Y_c)$. The CPU 21 then adds these values to reference distance values that are set in advance for the display apparatus (Step 4). The reference distance values for the spreadsheet window are assumed to be (X, Y). In this case, the coordinate values $(x_w, Y_w)$ of the result of addition are obtained as shown in the following Formula (1):

$$x_W = x_C + X \quad (1)$$
$$Y_W = Y_C + Y$$

The CPU 21 moves the auxiliary input window 45 in such a manner that the coordinate values $(x_w, Y_w)$ become the coordinates of the point on the auxiliary input window nearest to the cursor (Step 5). This movement is repeated as long as the character string is being displayed and the left button of the mouse 27 is being pressed (Steps 1–5). As a result, the operator is able to correct the initial display position of the auxiliary input window 45 shown in FIG. 4, when it is not appropriate.

Figure 6:
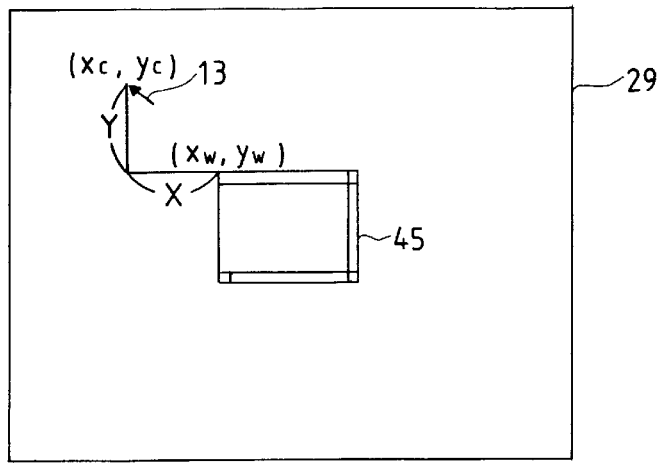
FIG. 6 is a diagram illustrating the correlations of three types of coordinates used in controlling the movement of the auxiliary input window.

FIG. 6 illustrates the correlations of three types of coordinates used in controlling the movement of the auxiliary input window.

The coordinate values indicated by the cursor 13 on the bit map display 29 are $(x_c, Y_c)$, and coordinates $(x_w, Y_w)$ at the upper left corner of the auxiliary input window 45 are set at a position removed by (X, Y) from the coordinate values $(x_c, Y_c)$. That is, if the cursor 13 is moved with the left button of the mouse 27 being pressed, the auxiliary input window 45 follows the cursor 13 while maintaining a predetermined distance therebetween.

Figure 7:
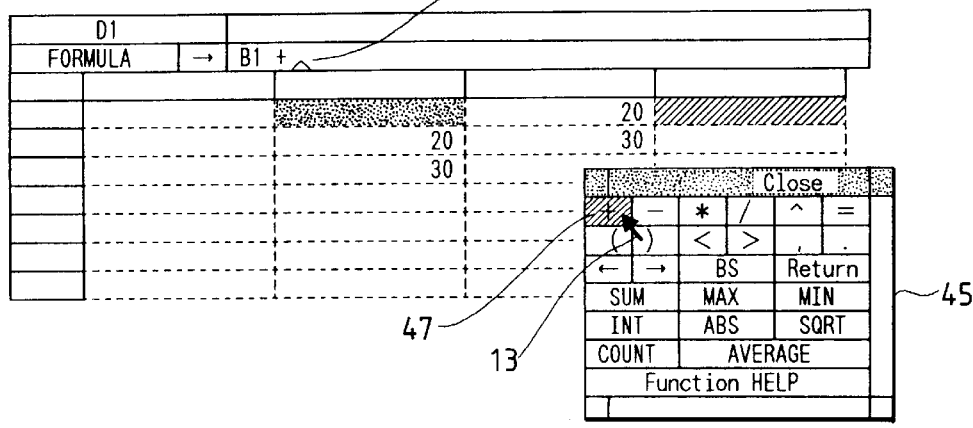
FIG. 7 is a plan view of essential portions of the display screen illustrating the manner in which a spreadsheet is prepared with the auxiliary input window set in a desired position.

FIG. 7 is a diagram illustrating the manner in which a spreadsheet is prepared with the auxiliary input window set in a desired position.

Since the operator has designated the B1 cell, as described in connection with FIG. 4, the operator inputs the addition code "+" from the auxiliary input window 45. Accordingly, the operator positions the cursor 13 on the "+" mark 47 in the auxiliary input window 45 by operating the mouse 27, and then clicks the left button. As a result, the display of "+" is added to the input editing area 44.

Figure 8:
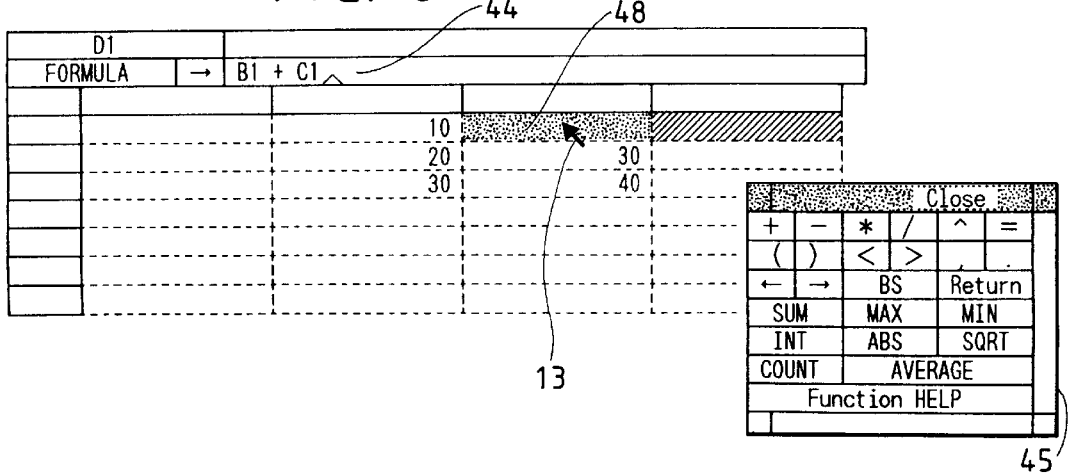
FIG. 8 is a plan view of essential portions of the display screen in a state in which the operation of designating a C1 cell is effected.

FIG. 8 is a diagram illustrating the operations as a consequence of designating the C1 cell.

The operator positions the cursor 13 on the C1 cell 48, and clicks the left button of the mouse 27. As a result, the character string "C1" is additionally displayed in the input editing area 44. At this time, the auxiliary input window 45 itself moves to a position that is a fixed distance from the cursor 13 in correspondence with the aforementioned distance values (X, Y) as the left button of the mouse 27 is clicked. In other words, the auxiliary input window 45 is kept at a position which does not cause an impediment to the operation.

Figure 9:
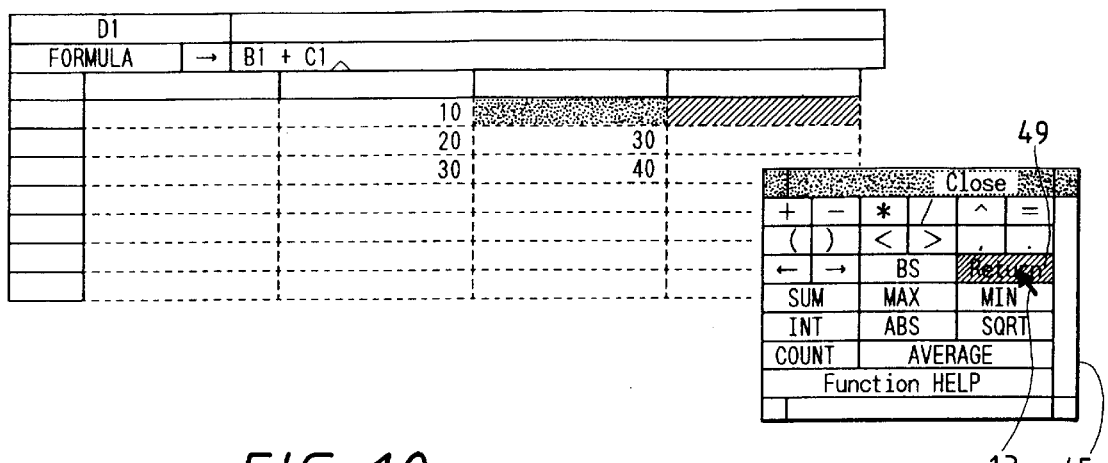
FIG. 9 is a plan view of essential portions of the display screen for describing the operation subsequent to the inputting of a formula.

FIG. 9 is a diagram for describing the operation subsequent to the inputting of a formula. When the formula "B1+C1" is thus inputted, the operator positions the cursor 13 on a "Return" mark 49 in the auxiliary input window 45, and clicks the left button of the mouse 27. As a result, the information processor recognizes that the inputting of the formula has been completed, so that it performs a calculation of that formula.

Figure 10:
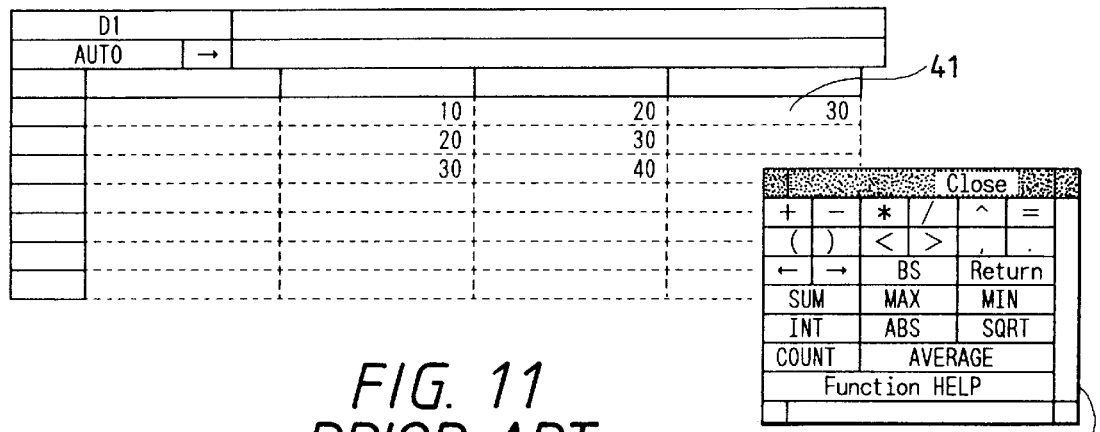
FIG. 10 is a plan view of essential portions of the display screen showing a result of a calculation.
Figure 11:
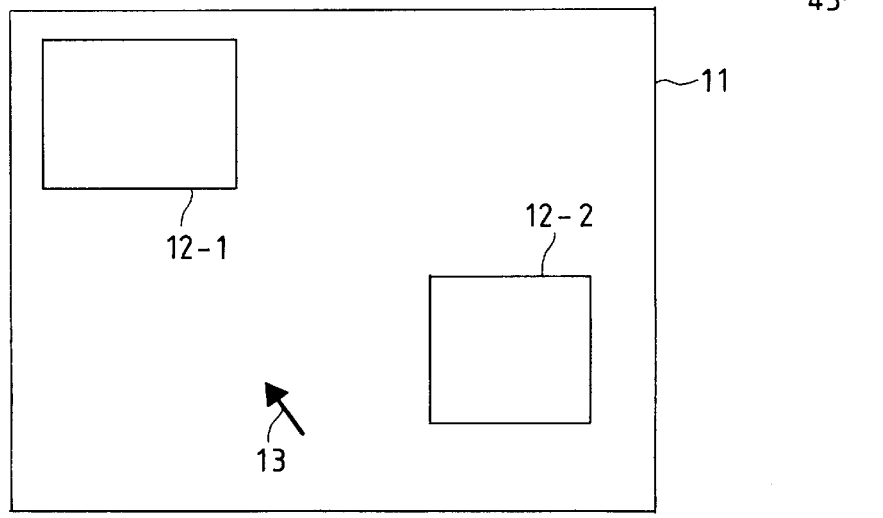
FIG. 11 is a plan view illustrating an example of the contents displayed on the display in a conventional information processor.

FIG. 10 shows the result of that calculation. A numerical value "30" which is the result of calculation is displayed in the D1 cell 41 highlighted, as explained in connection with FIG. 2. When closing the spreadsheet, it suffices if the operator clicks a command "Close" disposed in the upper portion of the auxiliary input window 45 by using the mouse 27 to close the window.

Although in the above-described embodiment the distance between the two windows is set in advance, an arrangement may be alternatively provided such that the distance that the cursor actually moves is measured, the measured amount is set as the reference data, and one window is made to move relative to the other by using this data.

In addition, although in the embodiment a description has been given of the case where the mouse is used as a pointing device, it is natural that the present invention is similarly applicable to cases where a cursor key or other similar pointing device is used.

As described above, in accordance with the present invention, since the arrangement provided is such that the position to which the window is moved is determined in correspondence with the coordinates of the cursor at a predetermined point of time, even if the display screen becomes large in size, and a multiplicity of windows are displayed on one screen, a necessary window can be kept close to an area of the screen where the operation is being carried out. Hence, the invention offers the advantage that information processing can be effected efficiently and accurately.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended thereto, and their equivalents.

What is claimed is:

1. A display apparatus comprising:
    a display;
    means for displaying a first window containing first information and a second window containing second information on the display;
    cursor means for indicating a first point on the display;
    means for positioning said second window on said display at a selected horizontal distance and a selected vertical distance from said first point, said second window being movable with said first point while maintaining said selected horizontal and vertical distances from said first point when said first point is moved to other positions on the display, said second window excluding the first point.

2. A display apparatus according to claim 1, wherein said positioning means comprises:
    means for storing a selected horizontal distance and a selected vertical distance;
    means for calculating coordinates of a second point on the display at said selected horizontal distance and said selected vertical distance from said first point; and
    means for moving said second window to a location on the display where a point on said second window nearest to said first point coincides with said second point.

3. A display apparatus according to claim 2, wherein
    said storing means stores reference coordinates representing said selected horizontal distance and said selected vertical distance;
    said calculating means adds said reference coordinates to coordinates of said first point.

4. A display apparatus according to claim 2, further comprising:
    means for selecting a horizontal distance and a vertical distance.

5. A display apparatus according to claim 1, wherein said second window is positioned at a distance from said first point to allow a portion of said first information to be displayed between said first point and said second window.

6. A display apparatus according to claim 1, wherein said selected horizontal distance and said selected vertical distance are greater than zero.

7. A method of positioning a plurality of windows on a display comprising the steps of:
    displaying a first window containing first information on said display;
    selecting a first point on said display; and
    displaying a second window containing second information on said display at a selected horizontal distance and a selected vertical distance from said first point to allow a portion of said first information to be displayed between said first point and said second window, said displaying step maintaining said selected horizontal and vertical distances between said second window and said first point when said first point is moved to other positions on the display, said second window excluding the first point.

8. A method of positioning a plurality of windows on a display according to claim 7, wherein said step of displaying a second window comprises the steps of:
    storing a selected horizontal distance and a selected vertical distance;
    calculating coordinates of a second point on said display at said selected horizontal distance and said selected vertical distance from said first point;
    moving said second window to a location on said display where a point on said second window nearest to said first point coincides with said second point.

9. A method of positioning a plurality of windows on a display according to claim 7, wherein said step of calculating coordinates comprises the step of adding coordinates representative of said selected horizontal distance and said selected vertical distance to coordinates of said first point.

10. A display apparatus according to claim 7, wherein said selected horizontal distance and said selected vertical distance are greater than zero.

11. A method of positioning a plurality of windows on a display comprising the steps of:
    preselecting a horizontal distance and a vertical distance;
    storing said preselected horizontal distance and said preselected vertical distance;
    displaying a first window containing first information and a second window containing second information on said display;
    selecting a first point on said display;
    calculating coordinates of a second point on said display at said preselected horizontal distance and said preselected vertical distance from said first point, said calculating step maintaining said preselected horizontal and vertical distances between said second point and said first point when said first point is moved to other positions on the display;
    moving said second window to a location on said display where a point on said second window nearest to said first point coincides with said second point, said second window excluding the first point; and
    repeating said selecting, calculating, and moving steps.

* * * * *